United States Patent [19]
Takagi

[11] Patent Number: 4,695,300
[45] Date of Patent: Sep. 22, 1987

[54] RADIAL FLOW TYPE DUST COLLECTING FILTER

[75] Inventor: Shigeru Takagi, Anjo, Japan

[73] Assignee: Nippon Soken, Inc., Nishio, Japan

[21] Appl. No.: 816,977

[22] Filed: Jan. 7, 1986

Related U.S. Application Data

[60] Division of Ser. No. 605,980, Apr. 20, 1984, abandoned, continuation of Ser. No. 360,768, Mar. 22, 1982, abandoned.

[30] Foreign Application Priority Data

Mar. 22, 1981 [JP] Japan .................... 56-41242

[51] Int. Cl.$^4$ ...................... B01D 46/52; B01D 50/00
[52] U.S. Cl. ...................... 55/485; 55/486; 55/487; 55/488; 55/498; 55/510; 55/521
[58] Field of Search ...................... 55/485–489, 55/498, 510, 521; 210/488, 489, 497.01, 487, 492, 490, 493.1, 493.5

[56] References Cited

U.S. PATENT DOCUMENTS

| | | | |
|---|---|---|---|
| 1,560,790 | 11/1925 | Jordahl | 55/487 |
| 1,851,427 | 3/1932 | Hinkle | 55/486 X |
| 2,145,049 | 1/1939 | Heuberger | 55/486 X |
| 2,426,405 | 8/1947 | McDermott | 55/510 |
| 2,651,417 | 9/1953 | Malanowski | 210/489 X |
| 3,064,820 | 11/1962 | Gillick, Jr. et al. | 210/488 |
| 3,290,870 | 12/1966 | Jensen | 55/486 |
| 3,321,088 | 5/1967 | Williamitis | 210/489 |
| 3,385,038 | 5/1968 | Davis | 55/498 X |
| 3,505,794 | 4/1970 | Nutter et al. | 55/487 |
| 3,799,354 | 3/1974 | Buckman et al. | 55/498 X |
| 3,867,294 | 2/1975 | Pall et al. | 210/489 |
| 3,937,663 | 2/1976 | Bessiere | 55/498 X |

FOREIGN PATENT DOCUMENTS

| | | | |
|---|---|---|---|
| 329099 | 5/1930 | United Kingdom | 55/498 |
| 902843 | 8/1962 | United Kingdom | 55/521 |

Primary Examiner—Kathleen J. Prunner
Attorney, Agent, or Firm—Cushman, Darby & Cushman

[57] ABSTRACT

A cylindrical radial flow type dust collector filter for filtering the fluid flowing in the radial direction thereof is disclosed. The filter is composed of a cylindrical first filter member having a zigzag-shaped cross section in the flowing direction of the fluid, a second filter member having flowing resistance smaller than that of the first filter member, which is arranged outside of the first filter member so as to cover the outer periphery thereof and a third filter member having flowing resistance substantially the same as that of the second filter member, which is arranged inside of the first filter member so as to cover the inner periphery thereof and to define an open passage for the fluid in the axially central portion thereof.

5 Claims, 8 Drawing Figures

RADIAL FLOW TYPE DUST COLLECTING FILTER

This is a division of application Ser. No. 605,980, filed Apr. 30, 1984, which was a continuation of application Ser. No. 360,768, filed Mar. 22, 1982, both abandoned which was abandoned upon the filing hereof.

BACKGROUND OF THE INVENTION

The present invention relates to a dust collecting filter for filtering a fluid containing particles (hereinafter will be called "dust"), particularly to a radial flow type dust collecting filter provided with a cylindrical filtering wall for filtering the fluid flowing in the radial direction of the cylindrical filtering wall.

Conventionally, such filters as described above have been composed of a flat sheet-shaped porous filter member or a corrugated porous filter member which is formed into a cylindrical shape.

These filters are mainly used for filtering fluid of which dust content is small, namely the dust load is small, and for filtering fluid of which dust size is substantially uniform, namely the particle diameter range of the dust is narrow.

However, when the dust load is large and when the particle diameter of the dust is widely distributed, these filters cannot filter the fluid sufficiently.

Namely, when a conventional filter having large meshes is used, a considerable amount of dust passes the filter without being collected thereby so that high dust collecting efficiency cannot be obtained. When a conventional filter having small meshes is used, the filter is apt to be clogged by the dust so that the pressure loss of the fluid is increased.

Accordingly, one object of the present invention is to provide a radial flow type dust collecting filter wherein the filter member is effectively utilized to collect dust without being clogged thereby.

Another object of the present invention is to provide a radial flow type dust collecting filter which is suitable for filtering a fluid containing dust of which the load is large and of which the particle diameter is distributed over a wide range.

DESCRIPTION OF THE DRAWINGS

Other objects and advantages of the invention will become apparent from the following description of embodiments with reference to the accompanying drawings wherein.

SUMMARY OF THE INVENTION

The filter of the present invention comprises a cylindrical first porous filter member having small meshes and comparatively large flowing resistance which is arranged so as to have a zigzag-shaped cross section in the flowing direction of the fluid, a second porous filter member which is arranged outside of the first filter member and a third porous filter member which is arranged inside of the first filter member. Each of the second filter member and the third filter member has meshes larger than those of the first filter member and flowing resistance smaller than that of the first filter member.

DETAILED DESCRIPTION OF THE INVENTION

Hereinafter, the present invention will be explained in detail in accordance with the embodiments with reference to the accompanying drawings.

Figure 1:
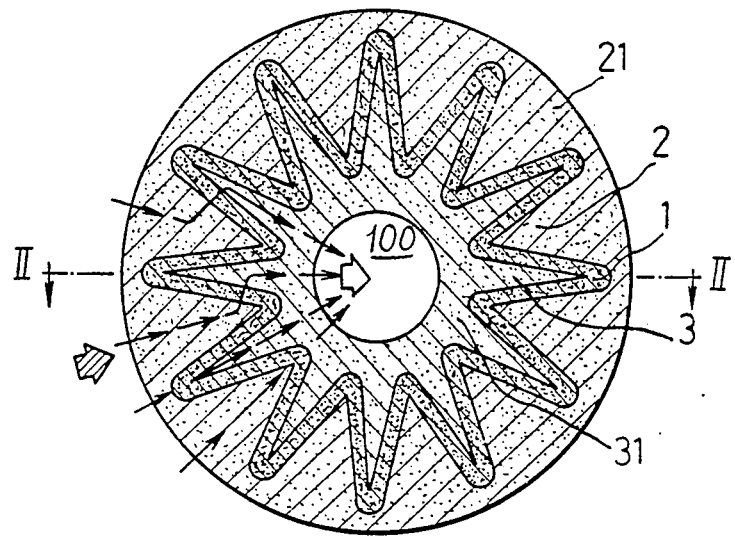
FIG. 1 is a cross sectional view of a first embodiment of a radial flow type dust collecting filter according to the present invention.
Figure 2:
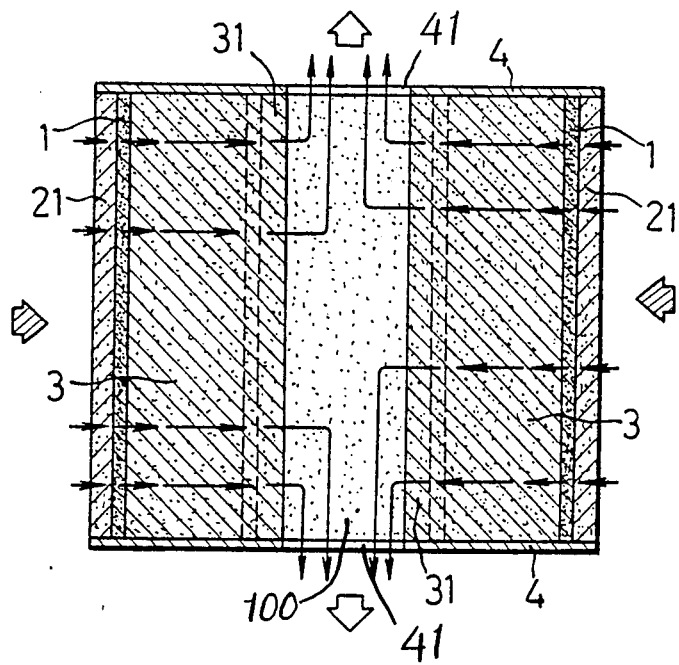
FIG. 2 is a longitudinal sectional view taken along the line II—II of FIG. 1.

FIGS. 1 and 2 illustrate a first embodiment of a dust collecting filter according to the present invention.

FIG. 1 is a sectional view taken in the radial direction of the dust collecting filter and FIG. 2 is a sectional view taken in the axial direction thereof.

The dust collecting cylindrical filter of the present invention comprises a thin walled first filter member 1 having comparatively small meshes and large flowing resistance, a second filter member 2 and a third filter member 3 with both members 2 and 3 having meshes larger than those of the first filter member 1 and flowing resistance smaller than that of the first filter member 1 and end plates 4. The whole filter has a thickwalled cylindrical shape. The fluid flows across the filter members 1, 2 and 3 in the radial direction of the filter into an axially extending central through hole 100 defined by the third filter member 3, and flows out of the filter through central holes 41 formed in the end plates 4.

The first filter member 1 is formed by forming a thin sheet with accordion like pleats into a cylindrical shape so as to have a zigzag-shaped cross section in the radial direction of the filter. The pleats define outwardly-facing and inwardly-facing longitudinal ridges separated by outwardly-facing and inwardly-facing valley-like longitudinal spaces. The second filter member 2 having meshes larger than those of the first filter member 1, has a cylindrical outer surface and is charged within or fills up the spaces on the upstream side of, that is outside of, the first filter member 1 and the third filter member 3 having the same meshes as the second filter member 2 has a cylindrical inner surface and is charged within the spaces on the downstream side of, that is inside of, the first filter member 1.

These filter members are formed of porous material, such as foamed ceramic, foamed urethane, filter paper or fibrous material, such as non-woven fabric, having a large number of small interconnected pores.

The first, second and the third filter members 1, 2 and 3 are put between the flat end plates 4 and secured thereto by an adhesive, for example.

Next, the operation of the dust collecting filter of the first embodiment having the above described construction will be explained.

When fluid containing dust of which the load is large and of which particle diameter range is wide, flows into the dust collecting filter from the outer surface thereof as shown by the arrows in FIGS. 1 and 2, the fluid firstly passes an outer peripheral portion 21 uniformly.

In the outer peripheral portion 21, dust having large particle diameter is mainly collected. As a result, the dust load on the downstream side of the outer peripheral portion 21 can be considerably decreased. Therefore, the filter members on the downstream side of the outer peripheral portion 21 are prevented from being clogged by the dust having large particle diameter.

Furthermore, since the outer peripheral portion 21 is charged with the filter member having large meshes, all the dust is not collected by the outer peripheral portion 21 so that the outer peripheral portion 21 is not clogged by the dust.

Next, the fluid flows through the second filter member 2 which is charged within the spaces formed on the upstream side of the first filter member 1. As the filtering area of the second filter member 2 for the fluid gradually decreases, the flowing speed of the fluid increases. As a result, the dust can be effectively collected by the second filter member 2 due to impaction of the dust. Consequently, the dust of which the particle diameter is more than about mean size can be mainly collected by the second filter member 2. Since the flowing resistance is comparatively small in the second filter member 2, pressure loss of the fluid does not increase so much in spite of high flowing speed.

Next, the fluid flows across the first filter member 1 having a zigzag-shaped section.

Since the filtering area and the flowing resistance of the first filter member 1 are large, as compared with those of the second filter member 2, the speed of the fluid decreases when passing through the first filter member 1.

Consequently, the dust can be effectively collected by the first filter member 1 due to diffusion of the dust. At this time, the dust of which the particle diameter is small, is mainly collected by the first filter member 1.

Furthermore, since the filtering area of the first filter member 1 is larger than that of the second filter member 2, the pressure loss of the fluid does not increase so much.

After passing the first filter member 1, the fluid flows through the third filter member 3 having large meshes and comparatively small flowing resistance, which is charged within the spaces defined by the first filter member 1 on the downstream side thereof.

At this time, the remaining dust is effectively collected by the third filter member 3 due to impaction of the dust.

Then, the fluid passes an inner peripheral portion 31 of the third filter member 3 and the filtered fluid flows out of the dust collecting filter through the central hole 100 and the end plate hole 41 as shown by the arrows in FIG. 2.

Since the flowing resistance of the second filter member 2 is made nearly equal to that of the third filter member 3, the total flowing resistance is nearly the same in any fluid flowing route from the second filter member 2 to the third filter member 3 by way of the first filter member 1.

Therefore, the fluid uniformly flows through the whole of the dust collecting filter without flowing through only one portion, i.e. route, of the filter. As a result, a small sized and light weight radial flow type dust collecting filter with high performance, excellent filtering efficiency and small pressure loss can be obtained.

Since each of the second and the third filter members 2 and 3 are integrally formed, respectively, by providing the cylindrical outer peripheral portion 21 and the cylindrical inner peripheral portion 31, each filter member can be easily produced and each filter member can be prevented from partially falling out of the filter so that the durability of the filter can be improved.

In particular, by providing the outer peripheral portion 21 in the second filter member having large meshes, the dust of which particle diameter is large can be selectively caught and collected therein. As a result, the dust load of the fluid flowing into the downstream side of the outer peripheral portion 21 can be considerably decreased.

Therefore, the filter members on the downstream side of the outer peripheral portion 21 are prevented from partially collecting the dust so that they are not clogged by the collected dust. Consequently, the life of the dust collecting filter can be made extremely long.

In addition, since the thin walled first filter member 1 is retained between the second filter member 2 and the third filter member 3, the first filter member 1 can be prevented from being deformed during the filtering operation.

Figure 3:
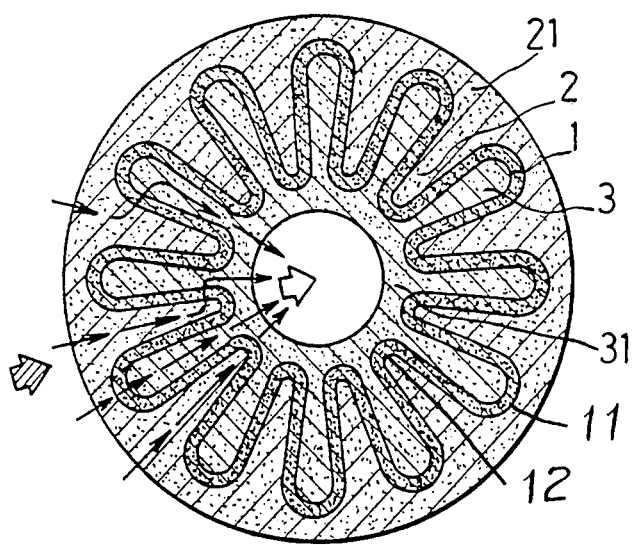
FIG. 3 is a cross sectional view of a second embodiment of the present invention.

FIG. 3 is a sectional view of a second embodiment of a radial flow type dust collecting filter according to the present invention, taken in the radial direction thereof.

The sectional view of the second embodiment taken in the axial direction thereof is the same as that of the first embodiment (FIG. 2).

In the filter of the second embodiment, the first filter member 1 has a zigzag cross section composed of straight portions and outwardly-facing circular arc-shaped convex portions 11 and concave portions 12 the curvature of which is larger than those of the first embodiment. Other structure of the second embodiment is substantially the same as that of the first embodiment.

According to the second embodiment, the filtering area of the first filter member 1 increases, as compared with that of the first embodiment so that the speed of the fluid flowing through the first filter member 1 is lessened, as compared with that of the first embodiment.

As a result, the dust having small particle diameter is collected by the first filter member more effectively and the pressure loss of the fluid can be lessened.

Figure 4:
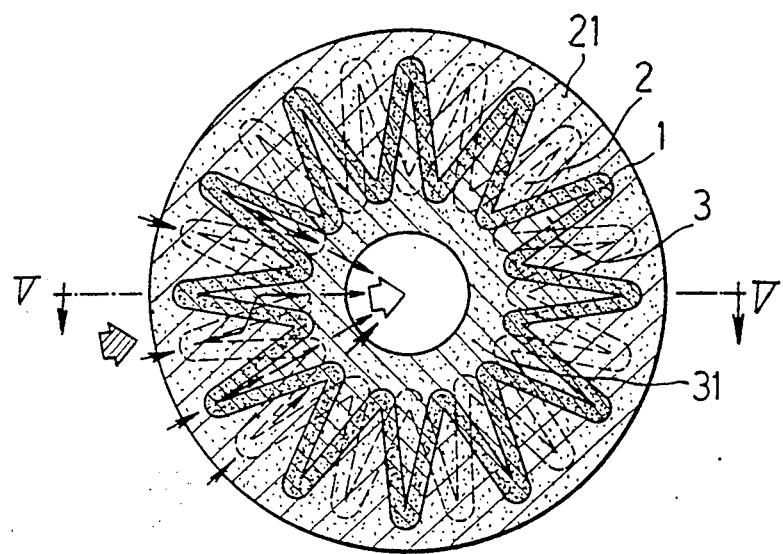
FIG. 4 is a cross sectional view of a third embodiment of the present invention taken along the line IV—IV of FIG. 5 which will be described below.
Figure 5:
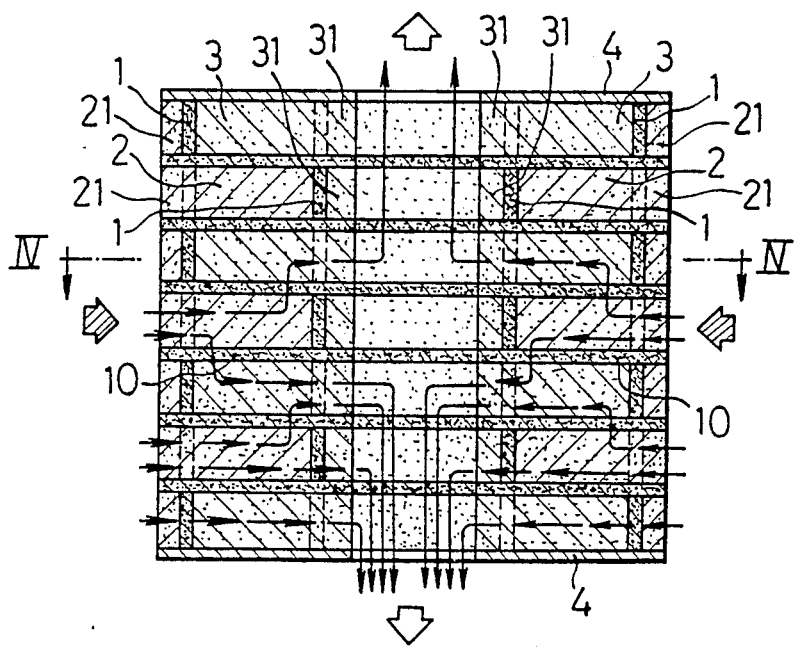
FIG. 5 is a longitudinal sectional view taken along the line V—V of FIG. 4.

FIGS. 4 and 5 illustrate a third embodiment of a radial flow type dust collecting filter according to the present invention.

In the third embodiment, a plurality of filter elements are coaxially stacked in the axial direction of the filter between the end plates 4. Each filter element is composed of the first, second and third filter members 1, 2 and 3, respectively, which are provided in the same manner as that of the first embodiment. Each filter element is joined to the adjacent elements through flat plate shaped annular fourth filter members 10, each of which is formed of the same material as that of the first filter member 1 and into the same thickness as that of the first filter member 1. The filter elements are arranged so that the circular arc-shaped portions of the first filter member 1 of one element are positioned angularly between those of the adjacent element.

In the filter of the third embodiment, the first filter members 1 and the fourth filter members 10 made of the same material as that of the first filter members 1 form a continuous zigzag-shaped cross section in the axial direction thereof composed of outwardly-facing convex portions 11 and concave portions 12, as shown in FIG. 5.

According to the third embodiment having the above described structure, by further providing the fourth filter members 10 the filtering area of the filter members having small meshes increases, as compared with that of the first embodiment. Therefore, the speed of the fluid flowing through the first and the fourth filter members 1 and 10 decreases much more so that the dust can be collected by the first and the fourth filter members 1 and 10 more effectively due to diffusion of the dust. Consequently, the dust collecting efficiency of the filter is largely improved and the flowing resistance thereof is much decreased.

In the third embodiment, the sectional shape of the first filter member in the radial direction of the filter can be formed into either that of the first embodiment (FIG. 1) or that of the second embodiment (FIG. 3).

Figure 6:
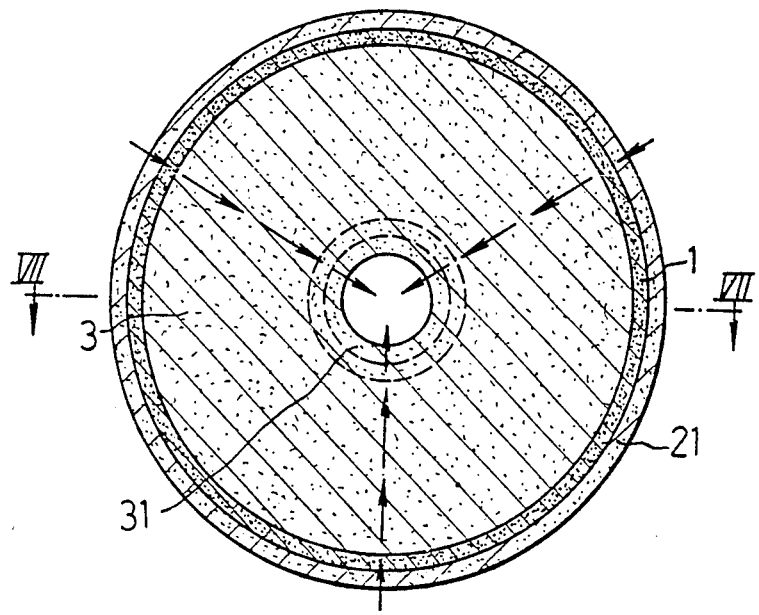
FIG. 6 is a cross sectional view of a fourth embodiment of the present invention taken along the line VI—VI of FIG. 7 which will be described below.
Figure 7:
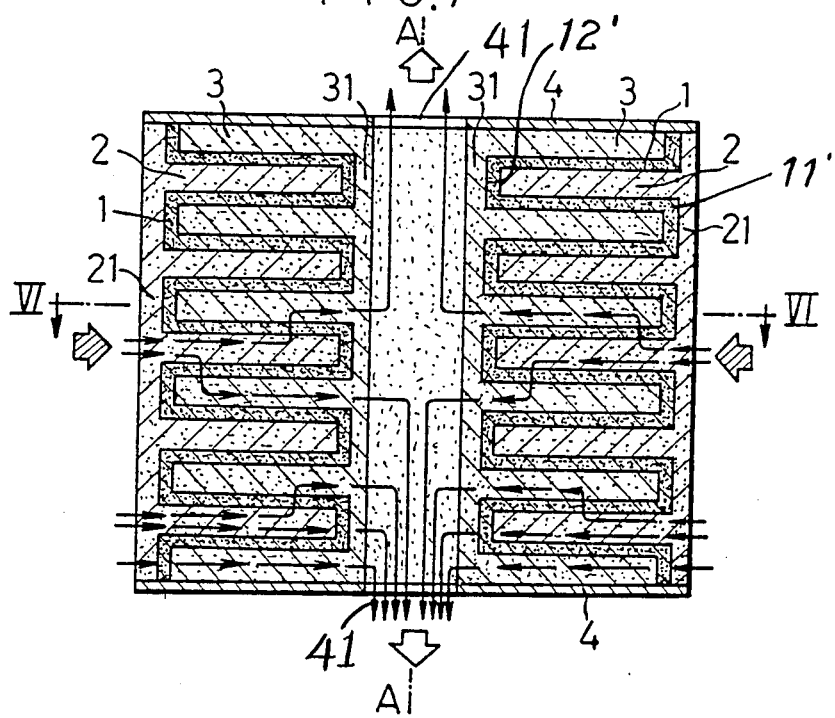
FIG. 7 is a longitudinal sectional view taken along the line VII—VII of FIG. 6.

FIGS. 6 and 7 illustrate a fourth embodiment of a radial flow type dust collecting filter according to the present invention.

In the fourth embodiment, a thin walled first filter member 1 has a continuous zigzag-shaped section in the axial direction of the filter, which is symmetric with respect to the axis A—A. The member is composed of the outwardly-facing ridge portions 11' and valley portions 12'.

Other structure of the fourth embodiment is substantially the same as that of the first embodiment.

By forming the first filter member 1 so as to be symmetric with the axis A—A, the first filter member 1 can be easily produced by preparing two axially symmetrical portions and joining them together into a unitary member.

Figure 8:
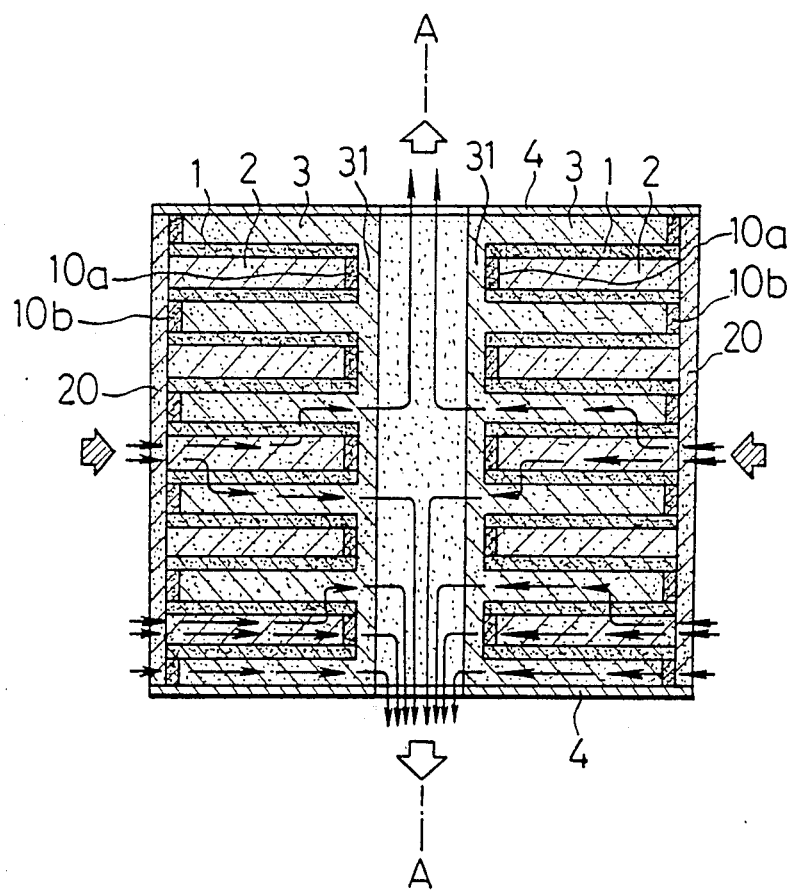
FIG. 8 is a longitudinal sectional view of a fifth embodiment of the present invention.

FIG. 8 shows a fifth embodiment of a radial flow type dust collecting filter according to the present invention.

In the fifth embodiment, about the outer peripheral portion of the second filter member 2, a fifth filter member 20 having meshes larger than those of the first filter member 1 and smaller than those of the second filter member 2 and flowing resistance smaller than that of the first filter member and larger than that of the second filter member, is charged so as to surround the first and second filter members 1 and 2.

By providing the fifth filter member 20, the dust of which particle diameter is about mean size or less can be collected to a certain extent. Therefore, the filter of the fifth embodiment is suitable for filtering the fluid containing dust of which particle diameter is mainly distributed to the smaller side.

Furthermore, the inner end portions 10a of the outwardly-facing valley portions 12' and/or the outer end portions 10b of the outwardly-facing ridge portions 11' of the first filter member 1 are formed of the material having flowing resistance different from that of the main portions thereof.

For example, when only the inner end portions 10a are formed of the different material of which flowing resistance is larger than that of the first filter member 1, the volume of the fluid flowing through the inner end portions 10a decreases so that the fluid mainly flows without passing through the inner end portions 10a. As a result, the speed of the fluid flowing through the third filter member 3 increases so that the dust can be collected by the third filter member 3 more effectively due to impaction of the dust.

According to this example of the fourth embodiment, the pressure loss is slightly increased but the dust collecting efficiency is improved.

Next, when the inner end portions 10a and the outer end portions 10b of the first filter member 1 are formed of the different material of which flowing resistance is larger than that of the remaining portions of the first filter member 1, the fluid mainly flows into the third filter member 3 withoiut passing through the inner end portions 10a and the outer end portions 10b. Therefore, the speed of the fluid flowing through the second filter member 2 can be also made larger in addition to the speed through the third filter member 3 so that the dust can be collected by the second and the third filter members 2 and 3 more effectively due to impaction of the dust.

According to this example, the pressure loss is increased but the dust collecting efficiency is much improved. Therefore, this example of the filter is suitable for filtering the fluid containing dust of which particle diameter is distributed to the smaller side much more.

The radial flow type dust collecting filter of the present invention has excellent characteristics as described above, and the structure thereof is simple.

Furthermore, the filter of the present invention can be produced easily.

Therefore, the filter of the present invention can be widely and effectively applied to a filter for collecting the dust in the fluid such as an oil filter, a fuel filter, an air. filter, and a filter for collecting the particulates in exhaust gases.

Having now fully described the invention, it will be apparent to one of ordinary skill in the art that many changes and modifications can be made thereto without departing from the spirit or scope of the invention as set forth herein.

What is claimed is:

1. A radial flow type dust collecting filter provided with a cylindrical filtering wall of substantially constant radial thickness for filtering fluid flowing in the radial inward direction of said filtering wall, comprising:
   a thin walled first filter member of generally cylindrical shape and having a generally zig-zag or corrugated configuration in longitudinal section to define circumferentially-extending inwardly-facing and outwardly-facing ridges separated by inwardly-facing and outwardly-facing valley-like spaces, said ridges having end portions connected to main portions of said first filter member;
   a second filter member which is disposed within and completely fills the outwardly-facing spaces defined by said first filter member;
   a third filter member which is disposed within and completely fills the inwardly-facing spaces defined by said first filter member, which interiorly covers said first filter member and which has a cylindrical interior surface defining an axially extending through hole in the center thereof; and
   a pair of end plates which are fixed to both axial ends of said first and third filter members, respectively, for retaining said filter members therebetween,
   at least one of said end plates having a central hole in communication with said through hole,
   at least said end portions of one of said inwardly-facing and said outwardly-facing ridges having a flowing resistance larger than that of said main portions of said first filter member, and each of said second filter member and said third filter member having generally the same flowing resistance smaller than that of said main portions of said first filter member for collecting dust primarily by impaction.

2. A radial flow type dust collecting filter according to claim 1, wherein:
said first, second and third filter members are formed of porous material provided with a large number of small interconnected pores.

3. A radial flow type dust collecting filter according to claim 2, wherein: said porous material is foamed ceramic, foamed urethane, filter paper or nonwoven fabric made of fiber.

4. A filter according to claim 1 wherein the end portions of both the outwardly-facing and the inwardly-facing ridges have a flowing resistance larger than that of said main portions of the first filter member.

5. A radial flow type dust collecting filter according to claim 1, further comprising:
a cylindrical filter member surrounding said first and second filter members; said cylindrical filter member having a flowing resistance larger than that of said second filter member and smaller than that of said main portions of said first filter member.

* * * * *